Oct. 29, 1957     E. S. DAVIS     2,810,922
VALVE FOR INFLATABLE ARTICLES
Filed Feb. 3, 1954
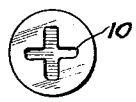
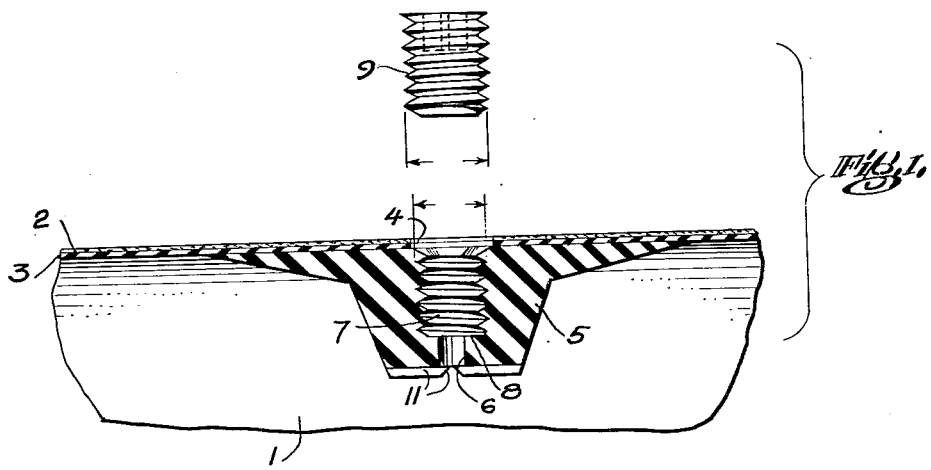
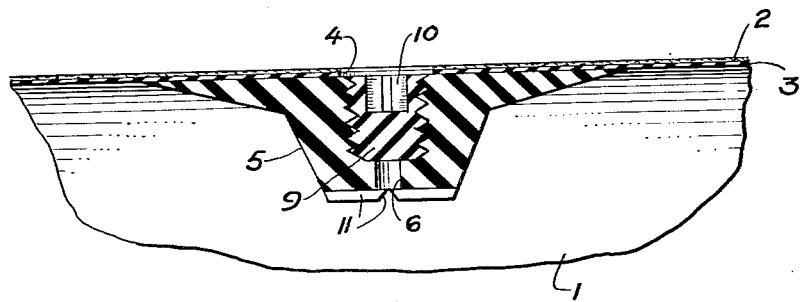
INVENTOR
Edwin S. Davis
BY
his ATTORNEYS United States Patent Office 2,810,922
Patented Oct. 29, 1957

2,810,922

VALVE FOR INFLATABLE ARTICLES

Edwin S. Davis, Hopewell Junction, N. Y., assignor to New York Rubber Corporation, New York, N. Y., a corporation of New York Application February 3, 1954, Serial No. 407,847

5 Claims. (Cl. 5—348)

This invention relates to a valve for inflatable articles such, for instance, as air mattresses, and has for an object to provide such a valve of which the operative parts are and, preferably, the whole is, composed of non-metallic material such as a rubber or plastic compound, preferably the former.

Another object is to provide such a valve which is devoid of outward projection from the article in which it is installed.

Another object is to provide such a valve which includes mating members that are of such relative size or dimensions as to establish a compressed contact when in sealing position.

Another object is to provide such a valve in which the mating members are threaded and one is also shouldered to promote effective air sealing.

Another object is to provide such a valve which is not readily opened without the aid of a special tool.

Another object is to provide such a valve which is not deleteriously affected by salt water, sand or low temperature.

Another object is to provide such a valve which is practically invisible when in sealing position, and which requires no special co-operative formation of the article in which it is installed, a mere aperture in the article being sufficient, whereby the valve may be positioned at any desired part of the article.

A further object is to provide certain improvements in the material, form, construction, and arrangement of the parts, whereby the above named and other objects inherent in the invention may be effectively attained.

In brief summary, the invention comprehends a non-metallic, preferably rubber, valve having an interiorly threaded and shouldered air passage member adapted to be secured to the inflatable article in register with an aperture in the latter, and an exteriorly threaded non-metallic, preferably rubber, plug designed to mate with the thread and shoulder of the air passage member and not to project from the inflatable article when in sealing position; the relative size of the threaded air passage and plug preferably being such as to establish compression therebetween when the latter is screwed into the former, and the head of the plug being preferably formed to receive a special turning tool.

A practical embodiment of the invention is shown in the accompanying drawing, in which:

Fig. 1 represents an exploded sectional view, partly in elevation, with the plug above the air passage member and with arrows and dimensional lines to indicate, with exaggeration, difference in relative size of the plug and the threaded portion of the air passage;

Fig. 2 represents a top plan view of the plug to exhibit its recess for receiving a special turning tool; and Fig. 3 represents a sectional view with the plug in sealing position.

Inflated mattresses such, for instance, as those used for water safety and pleasure, e. g., surf riding, are commonly fitted with metallic valves that project outwardly therefrom. The metallic material is objectionable as it lends itself to rusting, corrosion, and freezing, while the projection of the valve can cause personal injury as well as abrasion of the mattress and other things with which it comes into contact. Rusting or corrosion may lead to jamming of the valve and attempt to open the same with pincers, or the like, with the result of breaking the valve or tearing it loose from the mattress. Valves designed to be opened by hand or by an ordinary tool facilitate theft of leased mattresses, the deflation of which is usually needed to hide the theft. This is a matter of importance to beach concessionaires, and the like, who handle such mattresses. The use of needle valves for inflation to prevent theft does not solve the problem because of the time required for inflation. Metallic valves are subject to freezing and to be frozen to the flesh of a user; while a projecting valve is both unsightly and liable to be damaged by contact.

The present invention eliminates all the above mentioned pre-existing difficulties and disadvantages, while affording notable features of practical and commercial benefit.

Referring to the drawing, a portion of an inflatable mattress composed of rubberized textile fabric with the rubber layer or coating on the inside is denoted generally by 1, the fabric being marked 2 and the rubber 3. An aperture 4, preferably circular, is formed through the mattress.

The body member of the valve is indicated by 5. It is preferably circular in outline and, as clearly shown in Figs. 1 and 3, partakes of a formation that may be denominated a double truncated cone with the base of the cone that constitutes the upper portion being much larger than the base of the other cone.

As is also represented in the drawing, the body member is composed of rubber, the compounding of the rubber, as well as the compounding of the rubber layer or coating 3 of the mattress, being suitable for vulcanization with any desired and appropriate accelerator ingredient.

An axial air passage traverses the body member 5, consisting of an inner portion 6, and an enlarged outer portion 7, which latter is interiorly threaded. The junction of said two portions establishes a shoulder 8 which, as will hereafter appear, serves as an air sealing abutment.

The valve closing member consists of an exteriorly threaded plug 9, which is, like the body member, composed of rubber, and the thread of which is adapted to mate with the thread of the air passage portion 7; while the bottom of the plug is adapted to seat on the shoulder 8. As shown in a somewhat exaggerated manner in Fig. 1, the plug 9 is slightly larger in diameter than the air passage portion 7, thus insuring a very tight seal when the plug is screwed to closing position with its lower end pressed against the shoulder 8, as illustrated in Fig. 3. The rubber compound of the valve members should be sufficiently hard to make the threads operative, and yet sufficiently yielding to permit the entry into the air passage portion 7 of the slightly larger plug 9.

A recess in the form of a cross 10 is formed in the top of plug 9 to receive a complementarily shaped tool for the insertion and removal of the plug. The shape of this recess could be varied, the object being to require the use of a specially shaped turning tool for unscrewing the plug and deflating the mattress, which deflation is practically essential in connection with theft of the mattress.

With reference to production of the valve, it is deemed sufficient to say that the valve members may be compounded and molded in a manner similar to the manufacturing of mechanical rubber goods generally, all of which is thoroughly understood by operatives in the rubber industry. The assembling of the valve with the mattress is simply accomplished by merely vulcanizing the body member to the rubber layer or coating 3 of the mattress 1, in the position shown in Figs. 1 and 3. This is readily accomplished because the mattress is commonly composed of two halves which are separately made and then united. Thus the valve body member may be vulcanized to one half of the mattress with its air passage in register with aperture 4, before the mattress halves are joined together. The same is true of other inflatable articles which are produced in separate parts or sections.

The manner of closing and opening the valve is obvious, and it may merely be added that inflation can be by mouth or otherwise. To facilitate inflation by avoiding any tendency of the opposite side of the mattress to cover portion 6 of the air passage, radial grooves 11 are formed in the inner face of the body member 5 extending from the said air passage to the periphery of the body member. Four grooves are desirable.

When closed, the valve is largely invisible and, by coloring the plug 9 to match the mattress, the invisibility is almost complete.

When I refer to rubber in this specification and claims, I intend to include both natural and synthetic rubbers and suitable compounds thereof.

I desire it to be understood that various changes may be made in the form, construction, arrangement, and material of the parts without departing from the spirit or scope of the invention; and hence do not intend to be limited to details herein shown or described, except as the same may be included in the claims or be required by disclosures of the prior art.

What I claim is:

1. A valve designed and adapted for combination with an inflatable article such as an air mattress provided with an aperture through a wall thereof, said valve comprising an open body member composed of a plastic material, such as rubber, and provided with a normally open air passage therethrough, said body member being adapted to be secured in position by adhesion to the inner surface of said wall of the inflatable article with its air passage in register with the aperture in the inflatable article, and a complementary air passage closing member also composed of a plastic material, such as rubber, said air passage having an interior screw thread formed in its circumferential wall of plastic material, and the said closing member having the form of a screw threaded plug with the threads formed on its exterior of the plastic material and adapted to mate with the interior threads of the air passage in the body member, the comparative lengths of the threaded portion of the air passage and the closing plug being such that the outer end of the plug does not substantially protrude from the inflatable article when it is screwed into normal air passage closing position.

2. A valve as defined in claim 1, in which the closing plug is larger in diameter than the threaded air passage for establishing a compressed air seal.

3. A valve as defined in claim 1, in which the interior of the air passage is formed with a shoulder adapted for abutment by the inner end of the closing plug in order to establish an additional air seal.

4. A valve as defined in claim 3, in which the closing plug is larger in diameter than the threaded air passage for establishing a compressed air seal by the threaded portions of the body member and closing member in addition to the air seal established at the said shoulder.

5. A valve as defined in claim 4, in which the inner face of the body member is formed with at least one radial groove extending from the air passage to the periphery of the body member for facilitating inflation of the article by preventing the opposite wall thereof from covering the inner end of the air passage.

References Cited in the file of this patent

UNITED STATES PATENTS

| | | |
|---|---|---|
| 642,608 | Hilton | Feb. 6, 1900 |
| 1,328,780 | Barker | Jan. 20, 1920 |
| 1,481,018 | Littman | Jan. 15, 1924 |
| 1,766,182 | Markus | June 24, 1930 |
| 1,974,378 | Nicoll | Sept. 18, 1934 |
| 2,295,804 | Olson | Sept. 15, 1942 |
| 2,391,583 | Martin | Dec. 25, 1945 |
| 2,617,171 | Kimmel | Nov. 11, 1952 |

FOREIGN PATENTS

| | | |
|---|---|---|
| 800,465 | France | July 6, 1936 |